United States Patent
Sasaki et al.

(10) Patent No.: US 7,155,808 B2
(45) Date of Patent: Jan. 2, 2007

(54) METHOD OF MAKING THIN FILM MAGNETIC HEAD

(75) Inventors: Tetsuro Sasaki, Chuo-ku (JP); Soji Koide, Chuo-ku (JP); Eiichi Omata, Chuo-ku (JP); Masashi Sano, Chuo-ku (JP); Nobuya Oyama, Chuo-ku (JP)

(73) Assignee: TDK Corporation, Tokyo (JP)

( * ) Notice: Subject to any disclaimer, the term of this patent is extended or adjusted under 35 U.S.C. 154(b) by 224 days.

(21) Appl. No.: 10/866,742

(22) Filed: Jun. 15, 2004

(65) Prior Publication Data
US 2005/0041340 A1 Feb. 24, 2005

(30) Foreign Application Priority Data
Aug. 5, 2003 (JP) .............................. 2003-287083

(51) Int. Cl.
*G11B 5/127* (2006.01)
*H04R 31/00* (2006.01)

(52) U.S. Cl. ................ 29/603.07; 29/592.1; 29/611; 219/209; 360/128; 360/324

(58) Field of Classification Search ........... 29/592.1, 29/603.07, 610.1, 611; 219/209; 360/122, 360/126, 128, 317, 324
See application file for complete search history.

(56) References Cited

U.S. PATENT DOCUMENTS 4,318,881 A * 3/1982 Sopory .................. 264/346
4,543,474 A * 9/1985 Horsma et al. ............ 219/553
7,068,468 B1 * 6/2006 Kamijima ................ 360/128

FOREIGN PATENT DOCUMENTS

| JP | 04198036 A * | 7/1992 |
| JP | 05-020635 | 1/1993 |
| JP | A 5-20635 | 1/1993 |
| JP | A 7-57854 | 3/1995 |
| JP | A 2003-168274 | 6/2003 |

OTHER PUBLICATIONS

"Annealing effects on defect levels of CdTe:CI materials and the uniformity of the electrical properties"; Ayoub, M.; Hage-Ali, M.; Koebel, J.M.; Zumbiehl, A.; Klotz, F.; Rit, C.; Regal, R.; Fougeres, P.; Siffert, P.; Nuclear Science, IEEE Transactions on vol. 50, Issue 2, Apr. 2003 pp. 229-237.*

* cited by examiner

*Primary Examiner*—Paul D. Kim
(74) *Attorney, Agent, or Firm*—Oliff & Berridge, PLC

(57) ABSTRACT

A thin-film magnetic head comprises at least one of a magnetoresistive device and an electromagnetic transducer, and a heater adapted to generate heat upon energization. A method of making this thin-film magnetic head comprises a heater forming step of forming the heater, and an annealing step of annealing the heater formed by the heater forming step.

2 Claims, 14 Drawing Sheets

METHOD OF MAKING THIN FILM MAGNETIC HEAD

BACKGROUND OF THE INVENTION

1. Field of the Invention

The present invention relates to a method of making a thin-film magnetic head.

2. Related Background Art

A thin-film magnetic head provided with an electromagnetic transducer for writing and a magnetoresistive device for reproducing is configured so as to float up from a hard disk, which is a recording medium, at the time of recording and reproducing in a hard disk drive. Specifically, the thin-film magnetic head is mounted to a gimbal, which is attached to a leading end part of a flexible suspension arm, so as to construct a head gimbal assembly (HGA). As an airflow accompanying the rotation of the hard disk runs under the thin-film magnetic head, the suspension arm flexes, whereby the head floats up.

As hard disks have been achieving a higher density, the gap between the thin-film magnetic head and a hard disk, i.e., the head flying height, has been decreasing from 20 nm to 15 nm, and further to 10 nm, thereby approaching its limit.

SUMMARY OF THE INVENTION

For a further higher density, it has been demanded that the distance between the electromagnetic transducer or magnetoresistive device of the thin-film magnetic head and the recording medium be shorter than that conventionally available.

For fulfilling the above-mentioned demand, it is an object of the present invention to provide a method of making a thin-film magnetic head, which can further shorten the gap between the electromagnetic transducer or magnetoresistive device of the thin-film magnetic head and the recording medium.

As a result of diligent studies, the inventors have found the following. A thin-film magnetic head is provided with a heater adapted to generate heat upon energization, and the heater is heated, so that the thin-film magnetic head thermally expands. The thermal expansion of the thin-film magnetic head can reduce the distance between the magnetoresistive device or electromagnetic transducer and its opposing recording medium.

The inventors have further found the following fact. Namely, as operations of energizing and heating the heater are repeated, the ohmic value of the heater itself gradually changes (decreases), thereby making it hard to adjust the heating state of the heater to a desirable state. As a result, there is a fear of the distance between the magnetoresistive device or electromagnetic transducer and the recording medium opposing the same failing to keep a desirable value.

The present invention provides a method of making a thin-film magnetic head comprising at least one of a magnetoresistive device for reproducing and an electromagnetic transducer for writing, the method comprising a heater forming step of forming a heater adapted to generate heat upon energization and an annealing step of annealing the heater formed by the heater forming step.

In the thin-film magnetic head made by the method in accordance with the present invention, the heater is heated upon energization, so that the thin-film magnetic head thermally expands, whereby the distance between the magnetoresistive device or electromagnetic transducer and the recording medium is shortened.

In the making of the thin-film magnetic head, the formed heater is annealed, so that the ohmic value of the heater is changed beforehand, whereby the crystallinity of the material constituting the heater is improved. Therefore, even when operations of energizing and heating the heater are repeated, the heater is restrained from changing its ohmic value. This makes it relatively easy for the heater to keep a desirable heating state. As a result, the distance between the magnetoresistive device or electromagnetic transducer and the recording medium can be controlled so as to keep a desirable value.

Preferably, the heater is heated at a temperature of 200 to 300° C. in the annealing step. Here, the temperature refers to the temperature of the heater itself upon heating. Heating the heater at 200 to 300° C. as such can reliably reduce the change in ohmic value of the heater. This can also prevent devices such as the magnetoresistive device, shield members disposed near the magnetoresistive device, and the like from being adversely affected.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained with reference to the accompanying drawings. In the explanation, constituents identical to each other or those having functions identical to each other will be referred to with numerals identical to each other without repeating their overlapping descriptions.

Figure 1:
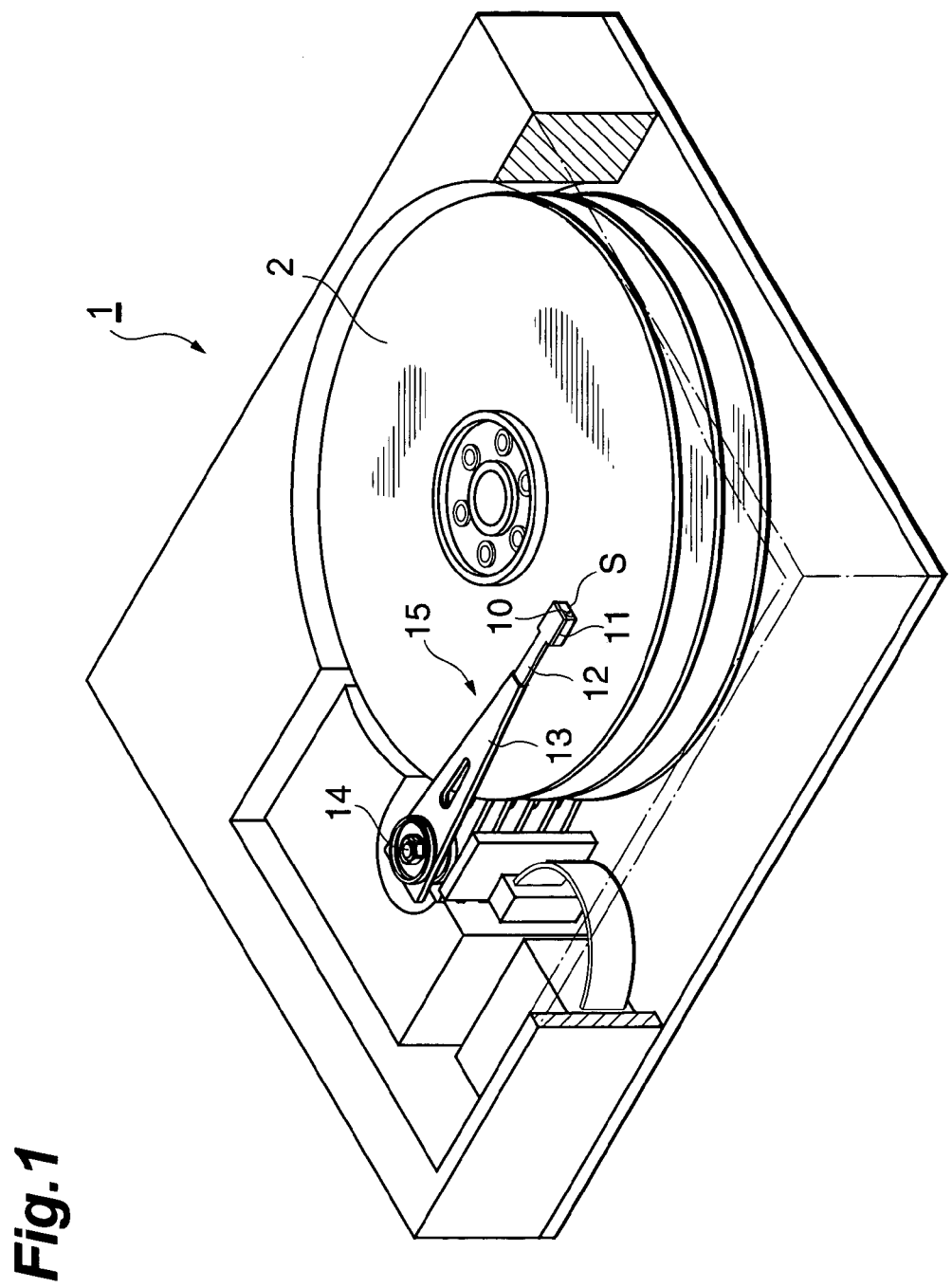
FIG. 1 is a perspective view showing a hard disk drive equipped with a thin-film magnetic head in which the making method in accordance with an embodiment of the present invention is employed.

FIG. 1 is a view showing a hard disk drive equipped with a thin-film magnetic head in which the making method in accordance with an embodiment of the present invention is employed. This hard disk drive 1 is one in which a head gimbal assembly (HGA) 15 is actuated, so that a thin-film magnetic head 10 records/reproduces magnetic information onto/from a recording surface (the upper face in FIG. 1) of a hard disk (recording medium) 2 rotating at a high speed. The head gimbal assembly 15 comprises a gimbal 12 mounted with a head slider 11 formed with the thin-film magnetic head 10, and a suspension arm 13 connected to the gimbal 12. The head gimbal assembly 15 is rotatable about a shaft 14 by a voice coil motor, for example. As the head gimbal assembly 15 is rotated, the head slider 11 moves radially of the hard disk 2, i.e., in directions traversing track lines.

Figure 2:
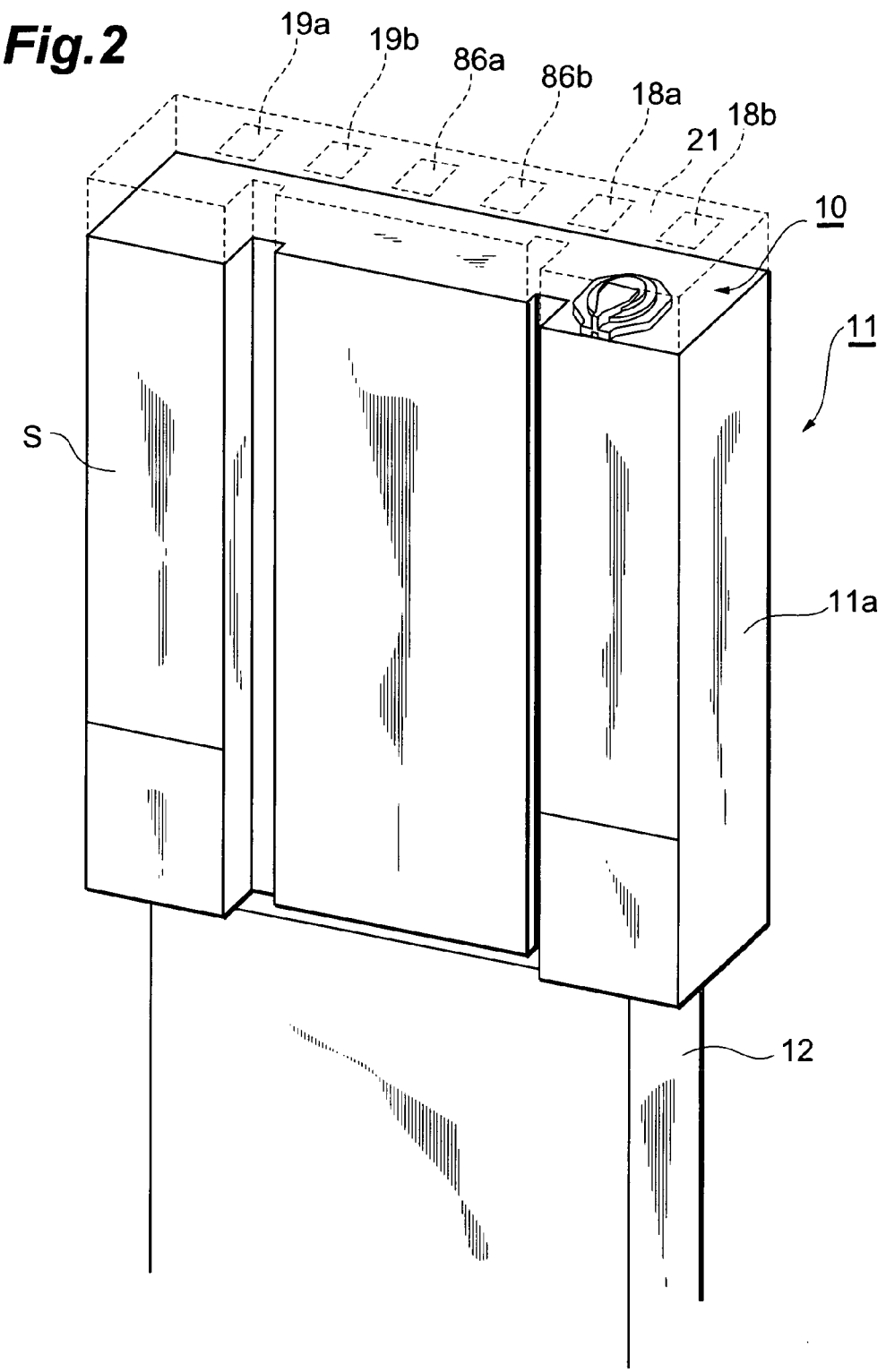
FIG. 2 is a perspective view showing a head slider.

FIG. 2 is an enlarged perspective view of the head slider 11. The head slider 11 has a substantially rectangular parallelepiped form. The thin-film magnetic head 10 is formed on a support 11a mainly composed of AlTiC ($Al_2O_3$.TiC). The front side in the drawing is a recording medium opposing surface facing the recording surface of the hard disk 2, and is referred to as air bearing surface (ABS) S. When the hard disk 2 rotates, an airflow accompanying the rotation causes the head slider 11 to float up, thereby separating the air bearing surface S from the recording surface of the hard disk 2. For protecting the thin-film magnetic head 10, the same is provided with an overcoat layer 21 (which will later be explained in detail) indicated by broken lines in the drawing. Recording pads 18a, 18b, reproducing pads 19a, 19b, and heater pads 86a, 86b, which will be explained later, are attached onto the overcoat layer 21. Leads (not depicted), connected to the individual pads, for inputting and outputting electric signals are attached to the suspension arm 13 shown in FIG. 1. The air bearing surface S may be coated with DLC (Diamond like Carbon) or the like.

Figure 3:
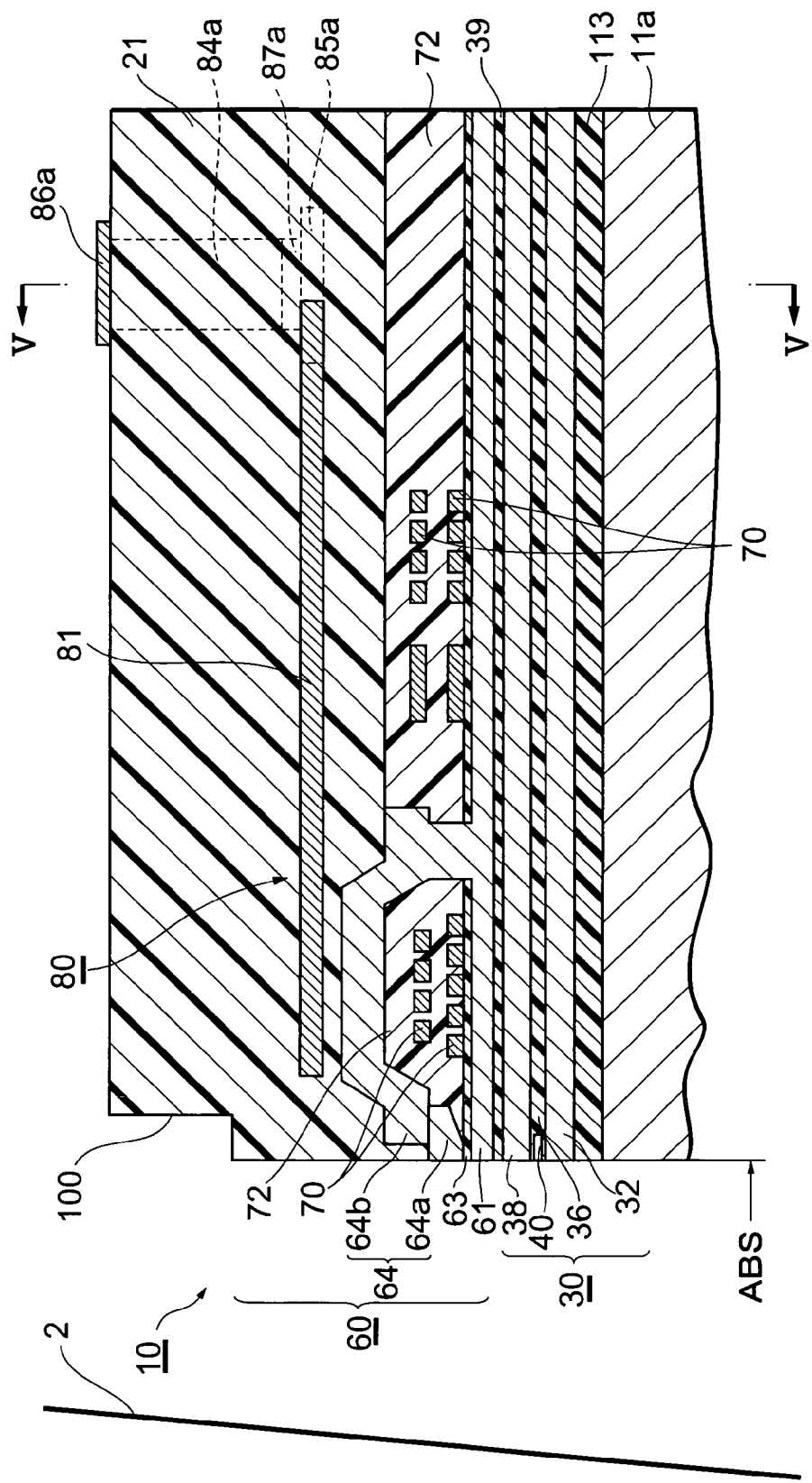
FIG. 3 is a sectional view showing the thin-film magnetic head in accordance with an embodiment of the present invention.
Figure 4:
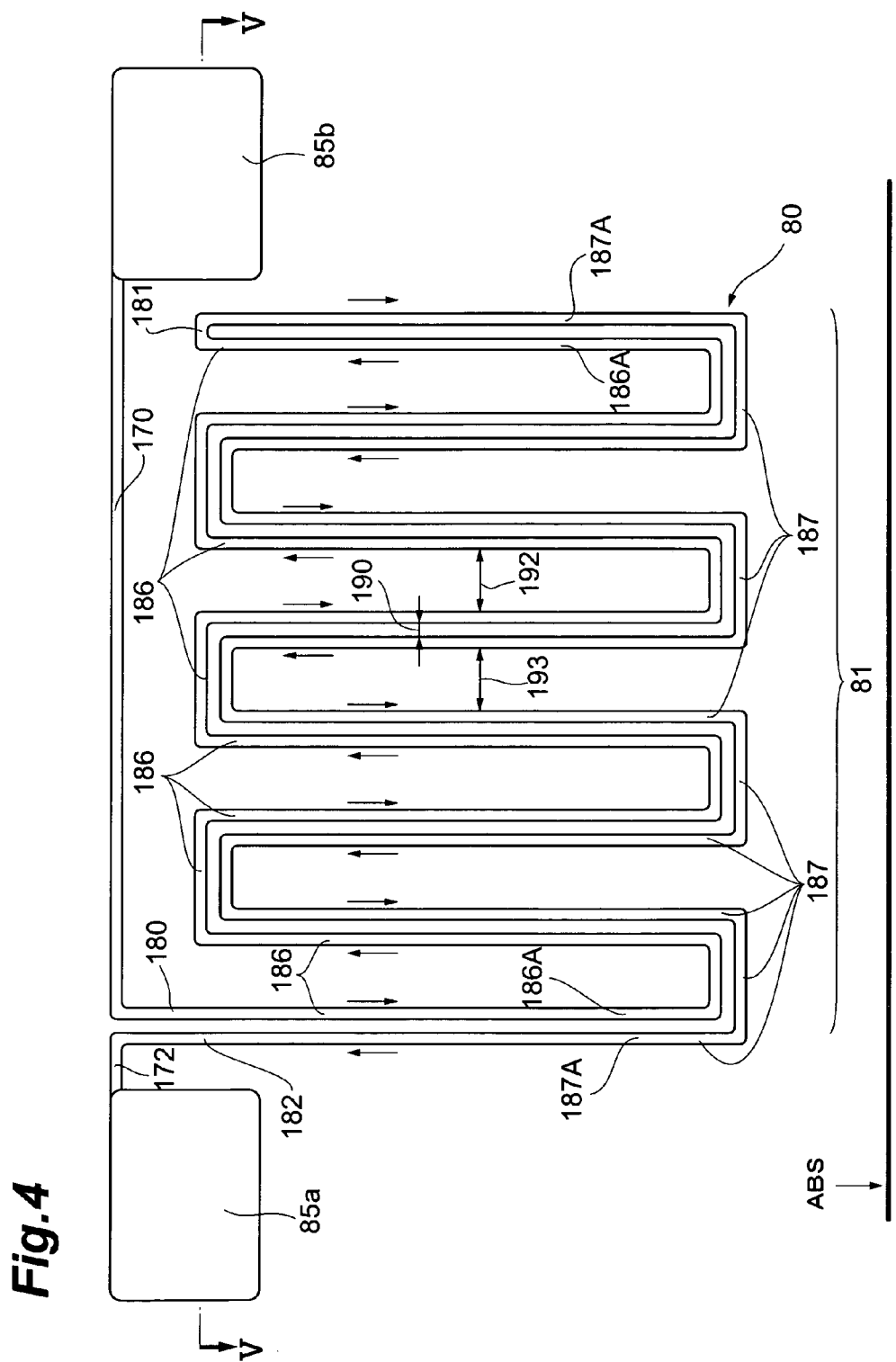
FIG. 4 is a plan view showing a heater of the thin-film magnetic head in accordance with the embodiment.
Figure 5:
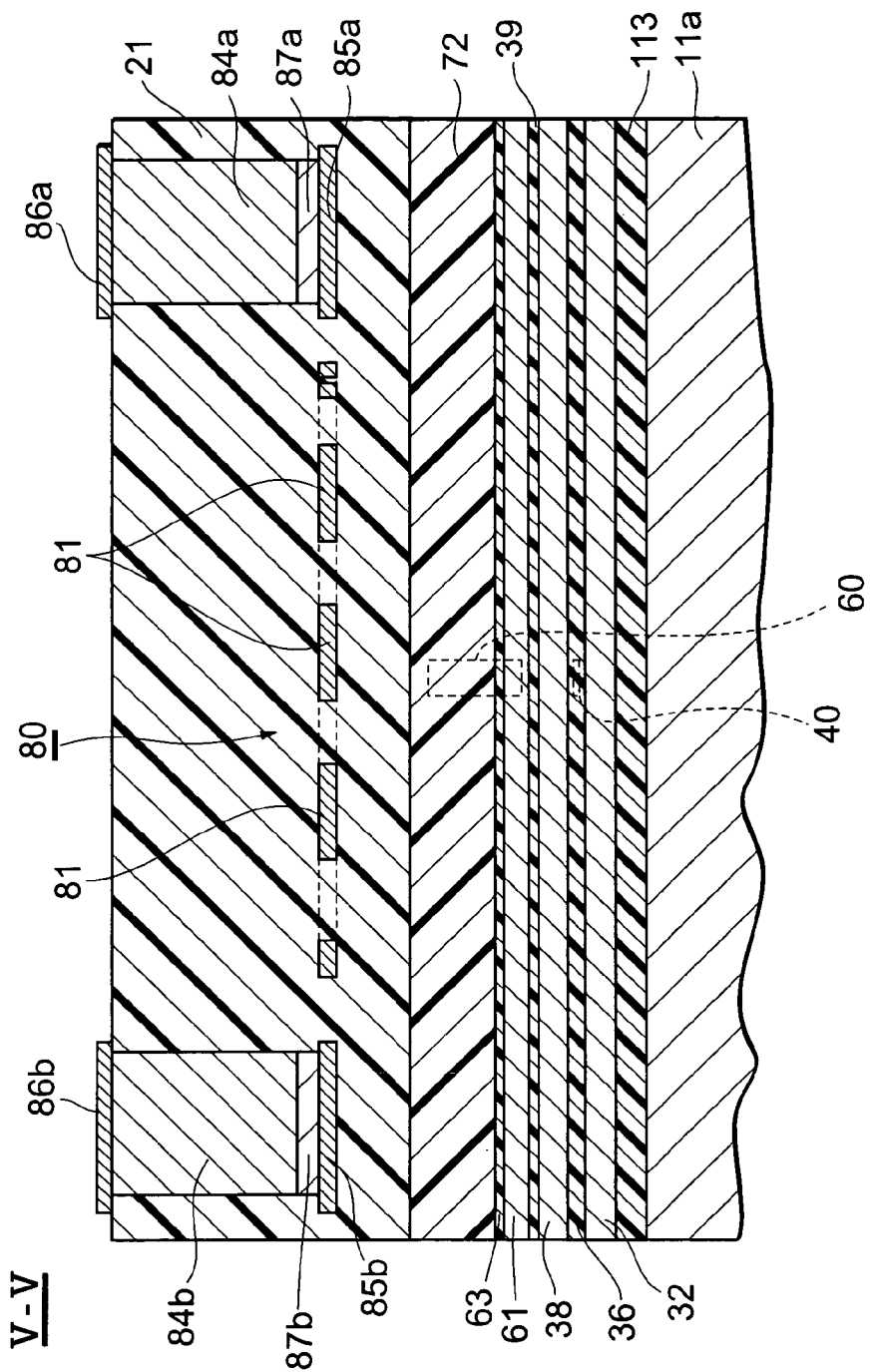
FIG. 5 is a sectional view of the thin-film magnetic head taken along the line V—V of FIG. 3.

FIG. 3 is a sectional view of the thin-film magnetic head 10 taken in a direction perpendicular to both the air bearing surface and track lines. FIG. 4 is a plan view of a heater in the thin-film magnetic head 10, in which the air bearing surface S is positioned on the lower side. FIG. 5 is a sectional view of the thin-film magnetic head taken in parallel with the air bearing surface S, corresponding to the line V—V of FIGS. 3 and 4. The thin-film magnetic head 10 is a composite thin-film magnetic head formed on the support 11a. As shown in FIG. 3, the thin-film magnetic head 10 mainly comprises a reproducing head part 30, a recording head part 60, and the overcoat layer 21 successively from the support 11a side. The reproducing head part 30 includes a GMR (Giant Magneto Resistive) device 40 as a magnetoresistive device. The recording head part 60 is an inductive electromagnetic transducer. The overcoat layer 21 is disposed on the recording head part 60.

The support 11a is a wafer-like substrate made of AlTiC ($Al_2O_3$.TiC) or the like. On the support 11a, an undercoat layer 113 made of an insulating material such as alumina is formed by a thickness of about 1 μm to about 10 μm.

The reproducing head part 30 is disposed on the undercoat layer 113. The reproducing head part 30 is constituted by a lower shield layer 32, an insulating layer 36, and an upper shield layer 38 which are laminated in succession from the undercoat layer 113 side. The GMR device 40 is included in the insulating layer 36 so as to be held by the insulating layer 36 from the upper and lower sides. The GMR device 40 utilizes a giant magnetoresistive effect yielding a large magnetoresistance change ratio, and is exposed to the ABS side while having a multilayer structure (not depicted). The lower shield layer 32 and upper shield layer 38 function to prevent the GMR device 40 from sensing unnecessary external magnetic fields, and contain a magnetic material. The thickness of the lower shield layer 32 is about 1μm to about 3 μm, whereas the thickness of the upper shield layer 38 is about 1μm to about 4μm. The thickness of the insulating layer 36 is about 0.05 μm to about 4 μm. While words "upper" and "lower" are used in this specification as in the case of shield layers, "lower" refers to the side nearer to the support 11a, whereas "upper" refers to the side farther from the support 11a.

The recording head part 60, which is a longitudinal recording type inductive electromagnetic transducer, is formed on the reproducing head part 30 by way of an insulating layer 39. The insulating layer 39 can use alumina having a thickness of about 0.1 μm to about 2.0 μm, but is not always necessary. The recording head part 60 comprises a lower magnetic pole 61 made of a soft magnetic material and a gap layer 63 made of a nonmagnetic insulating material in succession from the insulating layer 39 side. On the gap layer 63, a magnetic pole part layer 64a is laminated on the ABS side, whereas an insulating layer 72 including two stages, i.e., upper and lower stages, of a thin-film coil 70 is laminated on the side separated from the ABS. A yoke part layer 64b holding a part of the thin-film coil 70 between the yoke part layer 64b and the lower magnetic pole 61 and magnetically connecting with the lower magnetic pole 61 on the side separated from the ABS is disposed on the magnetic pole part layer 64a and the insulating layer 72. The recording head part 60 is constituted by the lower magnetic pole 61, gap layer 63, thin-film coil 70, insulating layer 72, and upper magnetic pole 64.

The lower magnetic pole 61 is formed from a magnetic material such as Permalloy (NiFe) by a thickness of about 1 μm to about 3 μm, for example.

The gap layer 63 is formed from a nonmagnetic insulator or a combination of a nonmagnetic conductor and a nonmagnetic insulator by a thickness of about 0.05 μm to about 0.5 μm, for example.

The magnetic pole part layer 64a constitutes the upper magnetic pole 64 together with the yoke part layer 64b and can be formed, for example, not only from Permalloy (NiFe), but also from (1) a material containing iron and nitrogen atom; (2) a material containing iron, zirconia, and oxygen atom; (3) a material containing iron and nickel element; etc. The thickness of the magnetic pole part layer 64a is about 0.5 μm to about 3.5 μm, for example, preferably 1.0 to 2.0 μm.

The yoke part layer 64b is made of the same material as with the magnetic pole part layer 64a, and its thickness is about 1 μm to about 5 μm, for example.

The thin-film coil 70 is made of a conductor such as Cu with each stage having a thickness of about 1 μm to about 3 μm, for example.

The insulating layer 72 is formed from an insulator such as alumina or resist by a thickness of about 0.1 μm to about 3 μm, for example.

When a recording current is caused to flow through the thin-film coil 70, a magnetic flux occurs between the magnetic pole part layer 64a and the lower magnetic pole 61, whereby information can be recorded on the recording medium 2 such as a hard disk.

The overcoat layer 21 is a layer made of an insulating material such as alumina for protecting the recording head part 60 of the thin-film magnetic head 10. The overcoat layer 21 is formed on the recording head part 60 by a thickness of about 5.0 μm to about 30 μm. In the overcoat layer 21, a ridge defined by the ABS and the upper face located farthest from the support 11a is formed with a cutout 100.

As shown in FIGS. 3 to 5, a heater 80 is provided within the overcoat layer 21 in this embodiment. The heater 80 is formed within the overcoat layer 21 in parallel with the upper shield layer 38 and the like while being separated from the ABS S by a predetermined distance.

As shown in FIG. 4, the heater 80 comprises a heating part 81 comprising a single line meandering within the layer, and extraction electrodes 85a, 85b. The extraction electrodes 85a, 85b are connected to both ends of the heating part 81, respectively. The heater 80 forms a predetermined length of conducting path. More specifically, the heating part 81 comprises an upward part 186, a downward part 187, and connecting parts 170 and 172. The upward part 186 is formed so as to meander like a rectangular wave from a predetermined start point 180 to a turning point 181. The downward part 187 returns from the turning point 181 to an end point 182 near the start point 180 while meandering along the upward part 186. The connecting part 170 electrically connects the start point 180 to the extraction electrode 85b. The connecting part 172 electrically connects the end point 182 to the extraction electrode 85a. The gap 190 between portions of the upward part 186 and downward part 187 formed along each other is narrower than the gap 192 between portions of the upward part 186 facing each other or the gap 193 between portions of the downward part 187 facing each other.

The thickness of the heater 80 is about 100 to 200 nm, for example.

The extraction electrodes 85a, 85b are made of the same material as with the heating part 81. As shown in FIGS. 3 and 5, conductive electrode film members 87a, 87b are formed on the extraction electrodes 85a, 85b, respectively. Upwardly extending bumps 84a, 84b are disposed on the electrode film members 87a, 87b, respectively. The bumps 84a, 84b are formed by electroplating using the electrode film members 87a, 87b as electrodes. The electrode film members 87a, 87b and bumps 84a, 84b are made of a conductive material such as Cu. The thickness of each of the electrode film members 87a, 87b is about 10 to 200 nm, whereas the thickness of each of the bumps 84a, 84b is about 10 to 30 μm.

Upper ends of the bumps 84a, 84b are exposed from the overcoat layer 21, whereas heater pads 86a, 86b are attached to their exposed surfaces, respectively. A current is supplied to the heater 80 by way of the heater pads 86a, 86b. Similarly, though not shown in FIGS. 3 and 5 for the sake of simplicity, the recording head part 60 is connected to the recording pads 18a, 18b (see FIG. 2), whereas the magnetoresistive device 40 of the reproducing head part 30 is connected to the reproducing pads 19a, 19b.

Figure 6:
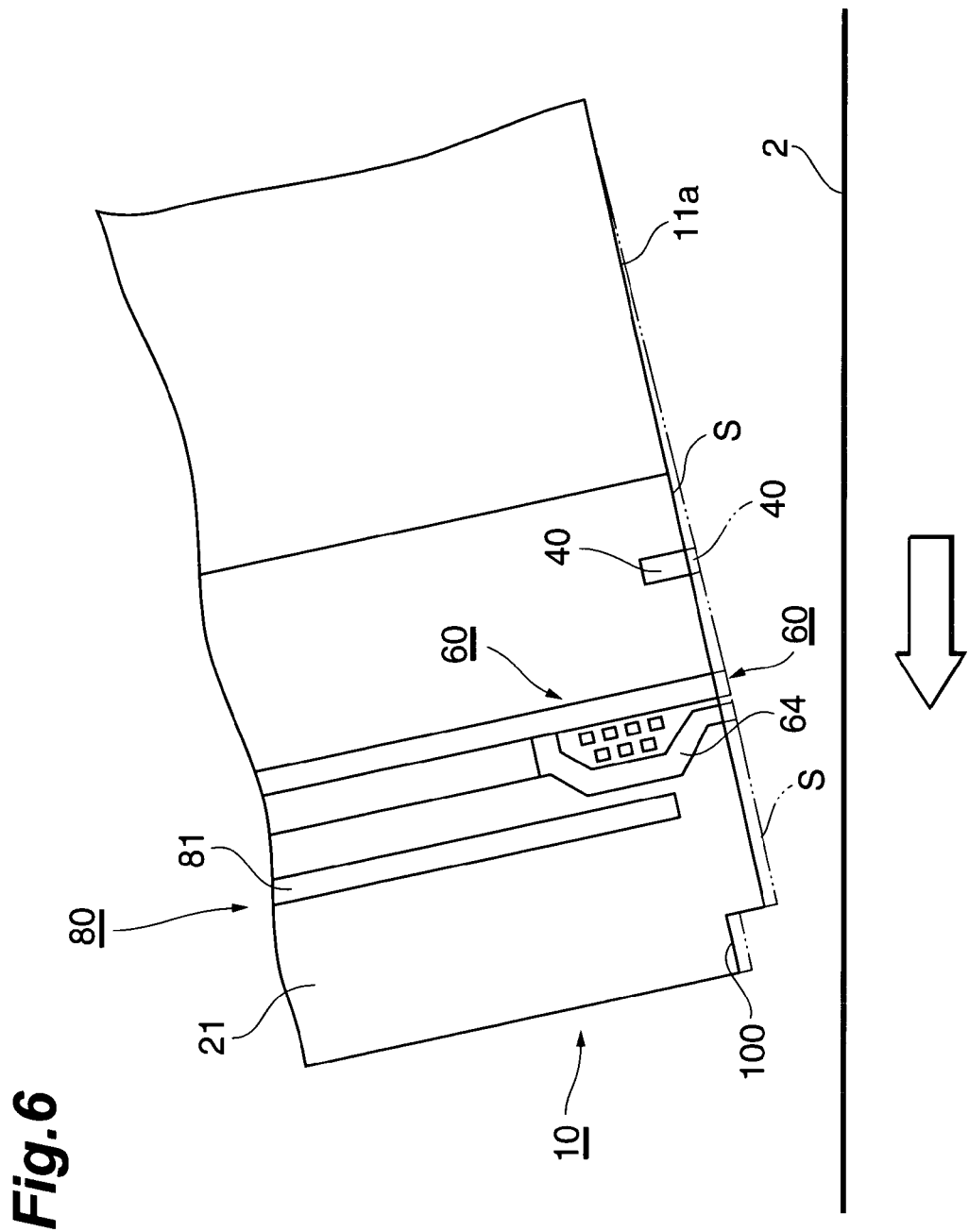
FIG. 6 is a schematic view showing a state where the thin-film magnetic head in accordance with the embodiment thermally expands.

Operations of thus configured thin-film magnetic head 10, head gimbal assembly 15, and hard disk drive 1 will now be explained. As shown in FIG. 6, when the hard disk 2 rotates in the direction of depicted arrow, an airflow causes the thin-film magnetic head 10 to float up and attain such an inclining posture (forward-tilted posture) that the upper magnetic pole 64 side of the recording head part 60 approaches the hard disk 2. When the heater 80 is energized here, the heat generated from the heater 80 thermally expands the thin-film magnetic head 10 about the heater 80. The thermal expansion of the thin-film magnetic head 10 about the heater 80 makes the ABS S of the thin-film magnetic head 10 and support 11a project toward the recording medium 2 as indicated by dash-double-dot lines. This reduces the gap between the GMR device 40 or recording head part 60 and the hard disk 2, thereby making it possible to yield a higher reproducing output and carry out writing with a high density, etc. Here, controlling the power supplied to the heater 80 can regulate the amount of projection and adjust the distance between the recording head part 60 or GMR device 40 and the recording medium 2 to a desirable value.

Since the heater 80 is disposed within the overcoat layer 21, this embodiment achieves a structure simpler than a structure in which a heater is disposed in a part lower than or on a level with the GMR device 40 or recording head part 60. As a result, the making of the thin-film magnetic head 10 becomes easier.

While the heater 80 is disposed within the overcoat layer 21, the recording head part 60 is disposed between the overcoat layer 21 and the GMR device 40. Therefore, the gap between the GMR device 40 and the heater 80 is greater than that between the recording head part 60 and the heater 80. As a result, the GMR device 40, which is relatively susceptible to influences of heating in particular, is less likely to be adversely affected by a high temperature, whereby the reliability can be improved.

Since the overcoat layer 21 of the thin-film magnetic head 10 is formed with the cutout 100, the ABS S of the thin-film magnetic head 10 is less likely to come into contact with the recording medium 2 even when projecting toward the hard disk 2 upon thermal expansion. The form of the cutout 100 is not limited to one stage of inverted L as in this embodiment, but may be a multistage cutout, a cutout having an inclined surface, etc.

In the heater 80, the upward part 186 and downward part 187 meander along each other as shown in FIG. 4. Therefore, as can be seen from Ampere's right-hand screw rule, respective magnetic fields generated from the upward part 186 and downward part 187 between the turning point 181 and the start point 180 and end point 182 cancel each other out. As a result, the leakage of magnetic fields decreases, thus becoming less likely to adversely affect the recording head part 60 or magnetoresistive device 40.

Also, the gap 190 is made narrower than the gap 193 or gap 192. Therefore, portions of the upward part 186 and downward part 187 disposed close to each other are less likely to be affected by magnetic fields from other portions of the upward part 186 and downward part 187 located far from the former portions, so that the magnetic fields generated upon energization cancel each other out more favorably. As a result, the leakage of magnetic fields from portions 186A and 187A of the downward and upward parts disposed along each other on the outermost side of the heater is reduced in particular.

As explained in the foregoing, this embodiment provides the thin-film magnetic head 10, head gimbal assembly 15, and hard disk drive 1, which can reduce the distance from the hard disk 2 and can achieve a further higher density.

Figure 7:
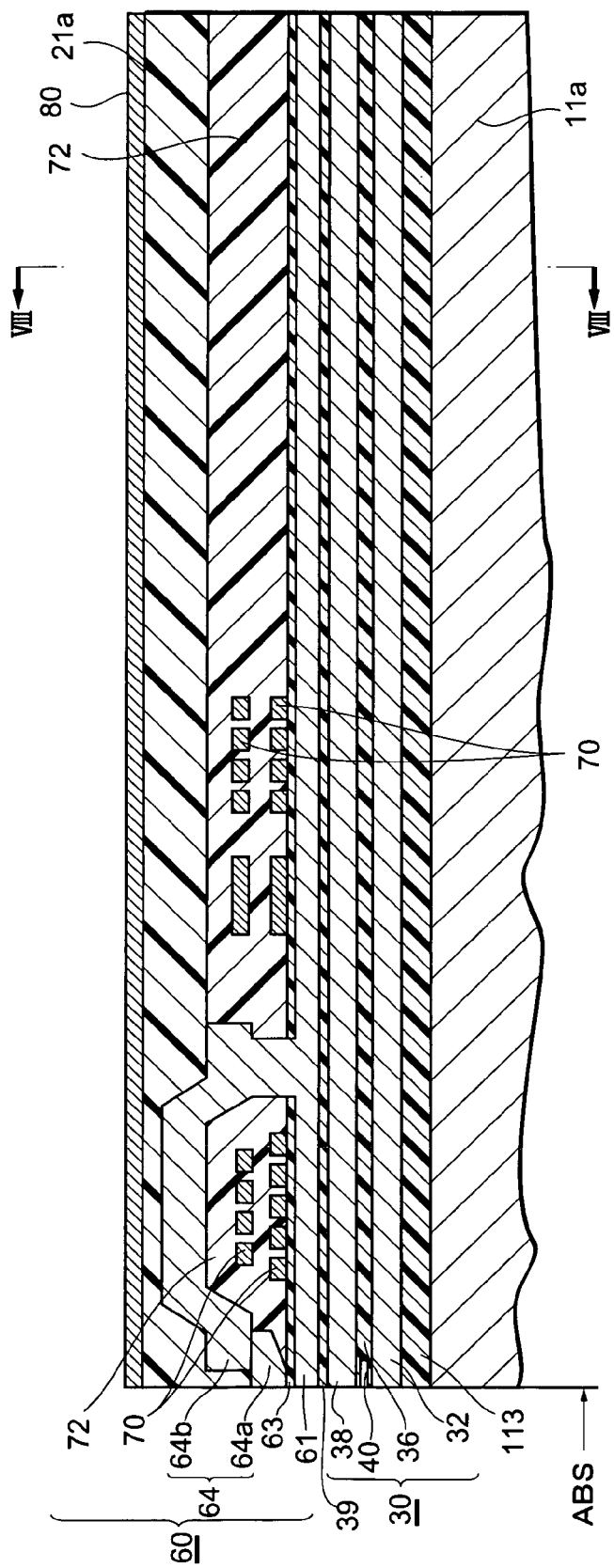
FIG. 7 is a view showing a method of making the thin-film magnetic head in accordance with the embodiment.
Figure 8:
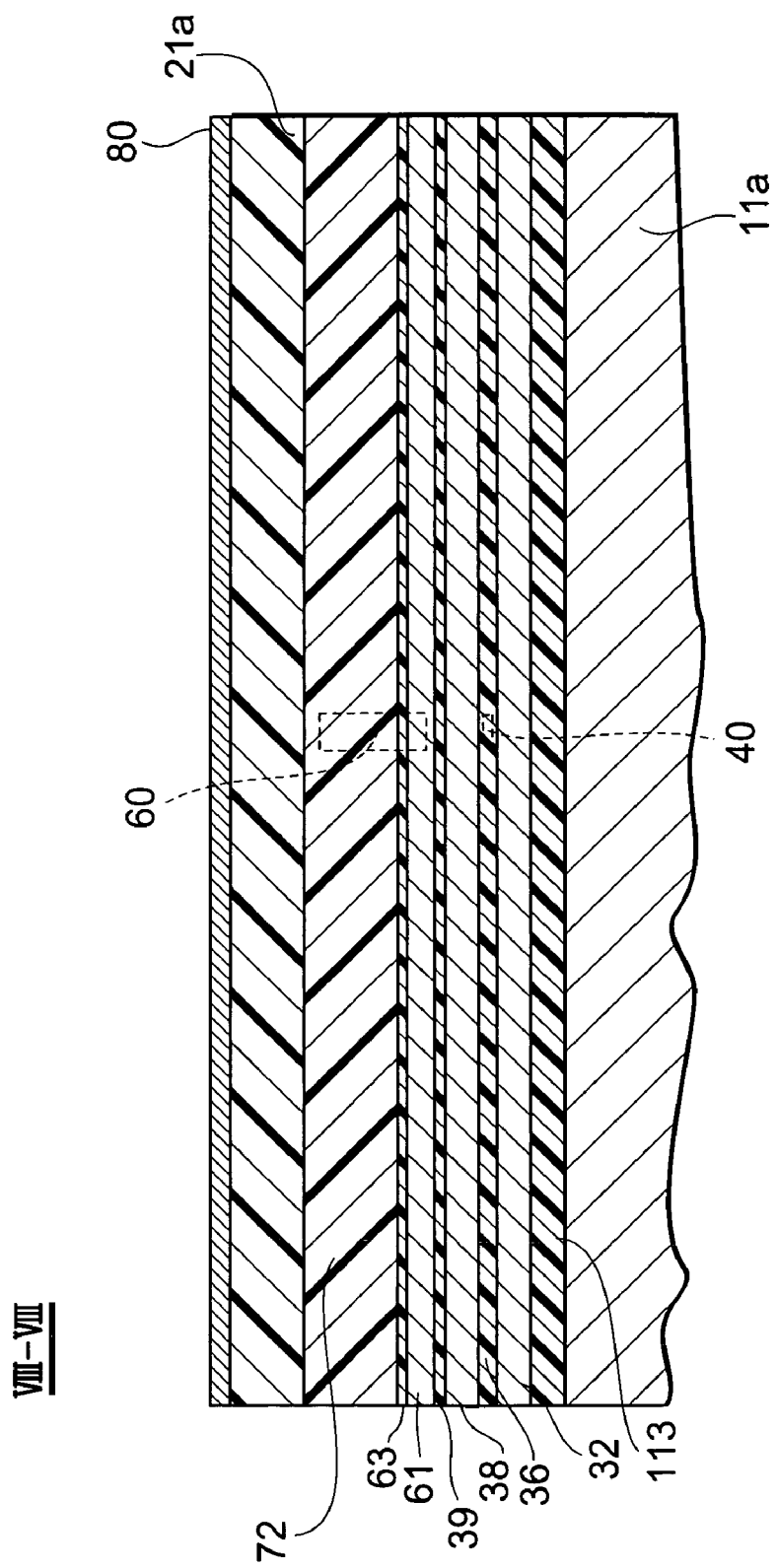
FIG. 8 is a sectional view taken along the line VIII—VIII of FIG. 7.

An example of the method of making the thin-film magnetic head in accordance with this embodiment will now be explained with reference to FIGS. 7 to 11. FIG. 7 is a sectional view of the thin-film magnetic head taken in a direction perpendicular to both the air bearing surface S and track lines. FIG. 8 is a sectional view of the thin-film magnetic head taken in parallel with the air bearing surface S in the state of FIG. 7, corresponding to the line VIII—VIII thereof. Known manufacturing steps will be explained in brief.

First, as shown in FIGS. 7 and 8, an undercoat layer 113 made of an insulating material such as alumina ($Al_2O_3$) is formed by sputtering on a support 11a which is a substrate made of AlTiC ($Al_2O_3$.TiC).

Subsequently, on the undercoat layer 113, a lower shield layer 32 made of a magnetic material such as Permalloy is formed by plating, for example. Further, on the lower shield layer 32, a GMR device 40 and an insulating layer 36 made of $Al_2O_3$ or the like holding the GMR device 40 vertically and horizontally are formed by a known technique. The GMR device 40 is constituted by a plurality of films in practice, but is depicted as a single layer. The GMR device 40 is formed on the ABS side. Subsequently, an upper shield layer 38 is formed on the insulating layer 36 by plating, for example. The foregoing yields the reproducing head part 30.

Next, an insulating layer 39 made of an insulating material such as $Al_2O_3$ is formed on the upper shield layer 38 by sputtering, for example.

Subsequently, the lower magnetic pole 61 made of Permalloy is formed on the insulating layer 39 by sputtering, for example. Then, a gap layer 63 made of a nonmagnetic insulator or a combination of a nonmagnetic conductor and a nonmagnetic insulator is formed on the lower magnetic pole 61 by sputtering, for example. Further, by a known method using photolithography, dry etching, or the like, an insulating layer 72 including two stages of thin-film coil 70, a magnetic pole part layer 64a of an upper magnetic pole 64, and a yoke part layer 64b of the upper magnetic pole 64 are formed on the gap layer 63. They are formed such that a part of the thin-film coil 70 is held between the lower magnetic pole 61 and upper magnetic pole 64. Though two stages of thin-film coil 70 are formed in this embodiment, the number of stages is not limited thereto. A helical coil or the like may be formed as well. This completes the recording head part 60.

Next, a nonmagnetic overcoat layer 21a is formed so as to cover the recording head part 60. Then, a film-like (layered) heater 80 made of a conductive material such as Cu, NiFe, NiCu, Ta, Ti, CoFe, CoNiFe alloy, or FeAlSi alloy is formed on the overcoat layer 21 by plating, for example (heater forming step).

Next, an annealing step is carried out. Namely, thus formed heater 80 is annealed. From the viewpoint of preventing the film of the heater 80 from oxidizing, etc., it will be preferred if the annealing is carried out in vacuum. The heating temperature for the heater 80 in the annealing falls within the range of 200 to 300° C., for example, preferably within the range of 200 to 250° C. When the heating temperature does not reach 200° C., the effect of restraining the ohmic value of the heater 80 itself from changing may not be obtained sufficiently. When the heating temperature exceeds 300° C., constituent members of the thin-film magnetic head 10 exemplified by devices such as the GMR device 40 and shield materials such as the upper shield layer 38 may adversely be damaged. The heating time for the heater 80 in the annealing is on the order of 30 minutes to 3 hours, for example.

Figure 9:
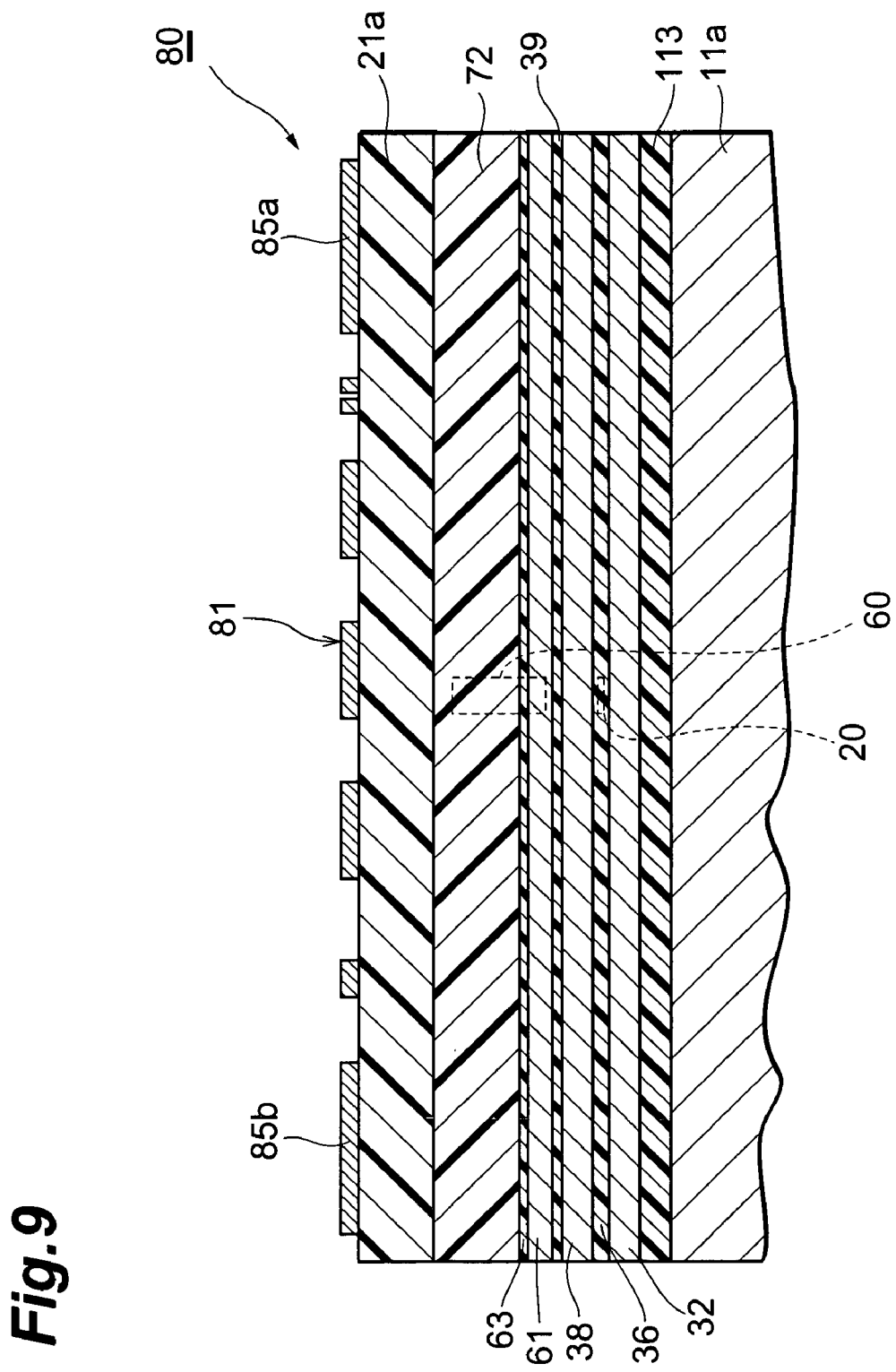
FIG. 9 is a view, subsequent to FIG. 8, showing the method of making the thin-film magnetic head in accordance with the embodiment.

After the annealing step, a part of the heater 80 is removed until the upper face of the overcoat lower layer 21a is exposed, so as to form extraction electrodes 85a, 85b as shown in FIG. 9. At the same time, another part of the heater 80 is removed until the upper face of the overcoat lower layer 21a is exposed, so as to form a meandering heating part 81 as shown in FIG. 9. The partial removable of the heater 80 can be carried out by ion milling or the like.

Figure 10:
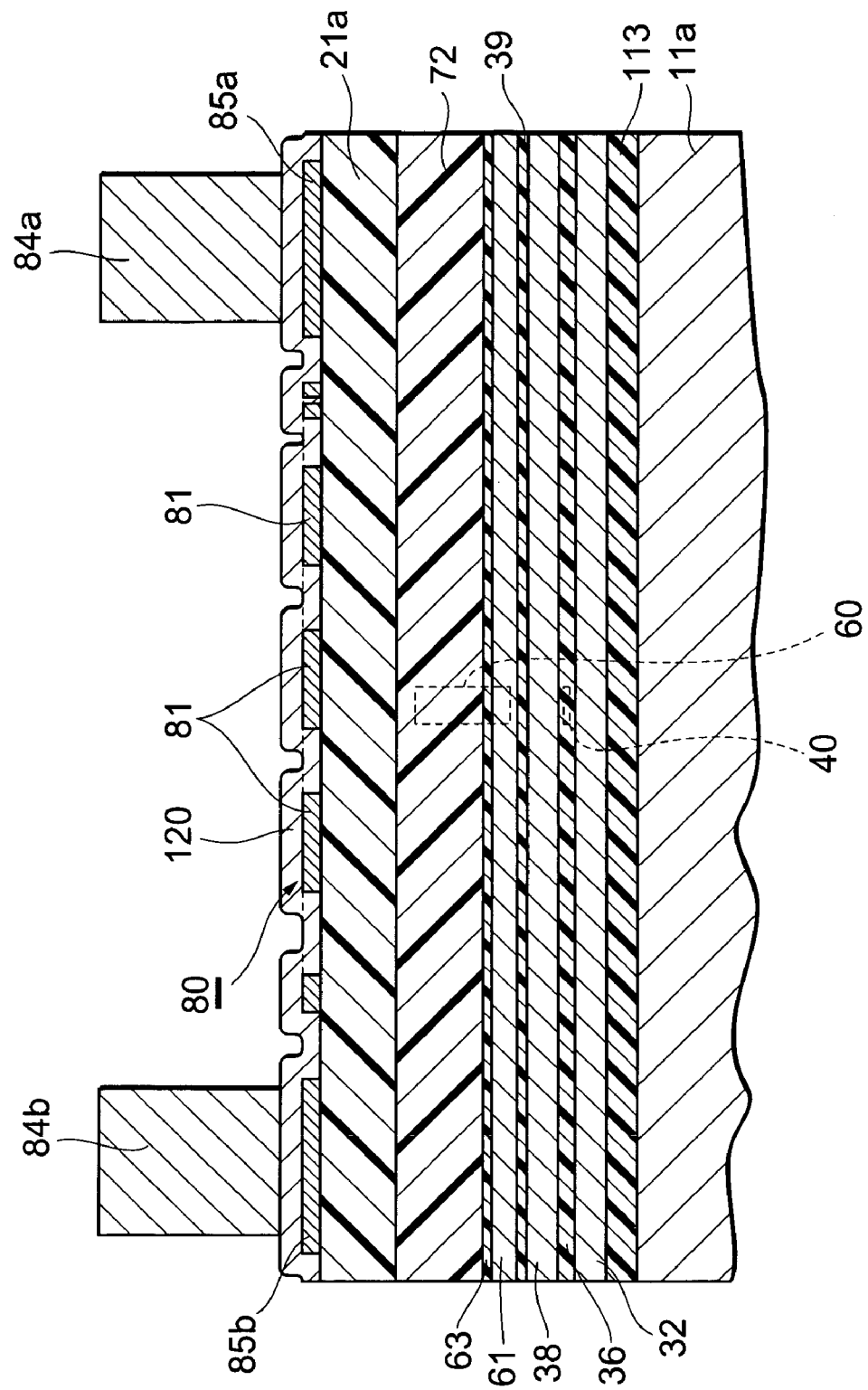
FIG. 10 is a view, subsequent to FIG. 9, showing the method of making the thin-film magnetic head in accordance with the embodiment.

Next, as shown in FIG. 10, a plating electrode film 120 made of a conductive material such as Cu is formed by sputtering or the like by a predetermined thickness, e.g., 10 nm to 200 nm, on the heating part 81 of the heater 80, the extraction electrodes 85a, 85b of the heater 80, and the portion of overcoat lower layer 21a exposed at the surface.

Subsequently, on the respective portions of the electrode film 120 in contact with the extraction electrodes 85a, 85b, upwardly extending bumps 84a, 84b are formed by plating using the electrode film 120 as an electrode.

Figure 11:
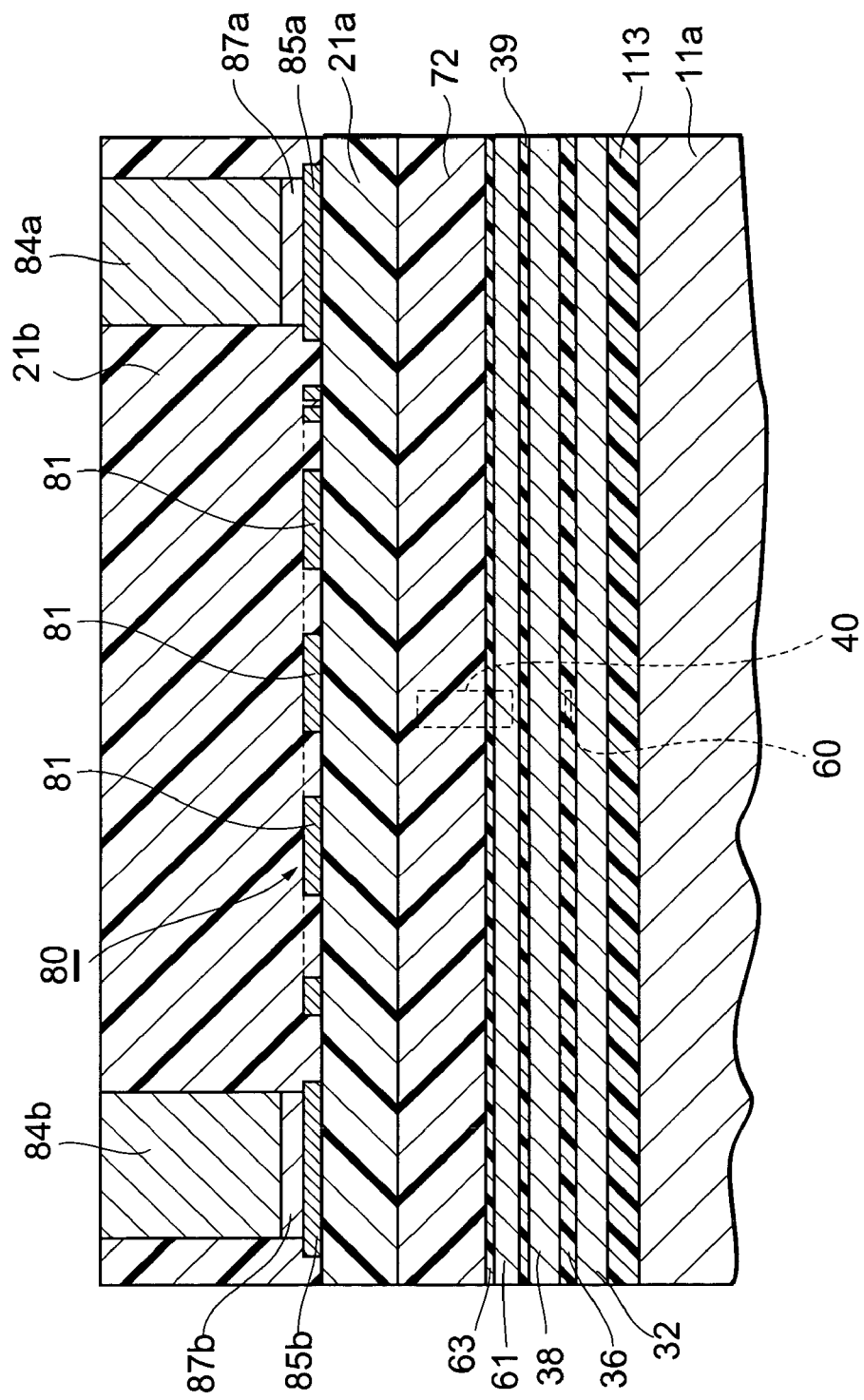
FIG. 11 is a view, subsequent to FIG. 10, showing the method of making the thin-film magnetic head in accordance with the embodiment.

Then, as shown in FIG. 11, the part of electrode film 120 exposed at the surface is removed by milling or the like while using the bumps 84a, 84b as masks. Here, the portions of electrode film 120 located under the bumps 84a, 84b are left as electrode film members 87a, 87b.

Thereafter, an insulating material such as $Al_2O_3$ is laminated as an upper layer by sputtering or the like, and then is shaven by polishing, for example, so as to yield a desirable height at which the bumps 84a, 84b are exposed to the upper face, thus yielding an overcoat upper layer 21b. Subsequently, heater pads 86a, 86b are provided at exposed portions of upper end parts of the bumps 84a, 84b, respectively. Here, the overcoat lower layer 21a and overcoat upper layer 21b correspond to the overcoat layer 21. Though not depicted, recording and reproducing pads are also formed here. Further, though not depicted, a ridge of the overcoat layer 21 is shaven, so as to form the cutout 100.

The foregoing completes the thin-film magnetic head 10 in accordance with this embodiment shown in FIGS. 3 to 5.

Subsequently, the support 11a is formed with a slider rail by ion milling or the like, whereby the head slider 11 shown in FIG. 2 is obtained. This head slider 11 is mounted to the gimbal 12, which is then connected to a suspension arm 13, whereby the head gimbal assembly 15 shown in FIG. 1 is completed. Thus produced head gimbal assembly 15 is then assembled such that the head slider 11 is movable over the hard disk 2 and that magnetic signals can be recorded and reproduced, whereby the hard disk drive 1 shown in FIG. 1 is completed.

In the method of making the thin-film magnetic head in accordance with this embodiment, the heater 80 is annealed, whereby the ohmic value of the heater 80 is forcibly changed. This improves the crystallinity of materials constituting the heater 80, whereby the ohmic value of the heater 80 attains a state hard to change. As a result, the ohmic value of the heater 80 does not change much even when operations of energizing and heating the heater 80 are repeated. Therefore, it becomes relatively easy for the heater 80 to keep a desirable state. As a result, the distance between the reproducing head part 30 or recording head part 60 of the thin-film magnetic head 10 and the hard disk 2 can be controlled so as to keep a desirable value.

When the heating temperature for the heater 80 in the annealing step is 200 to 300° C., the change in ohmic value of the heater 80 can reliably be reduced. This can also prevent constituent members such as individual devices and shield members provided in the thin-film magnetic head 10 from being adversely affected.

Though a preferred embodiment of the present invention is explained in detail in the foregoing, the present invention is not limited to the above-mentioned embodiment. For example, though the heater forming step lasts up to the forming of the film-like (layered) heater 80, and the film-like heater 80 is annealed in the above-mentioned embodiment, the heater forming step may last up to the forming of the heating part 81 in which a single line is caused to meander within a layer and the extraction electrodes 85*a*, 85*b*, and the heater 80 in this state may be annealed.

Though the heater 80 is formed within the overcoat layer 21, it may be formed between the recording head part 60 acting as an electromagnetic transducer and the support 11*a*. The heater 80 may be formed between the reproducing head part 30 including a magnetoresistive device and the support 11*a* as well. In this case, the heater 80 is formed earlier than the reproducing head part 30 or recording head part 60, whereby the heater 80 can be annealed with no regard to influences on the recording head part 60 and reproducing head part 30. This allows the heating temperature for the heater 80 in the annealing to rise to a temperature of about 300° C.

Figure 13:
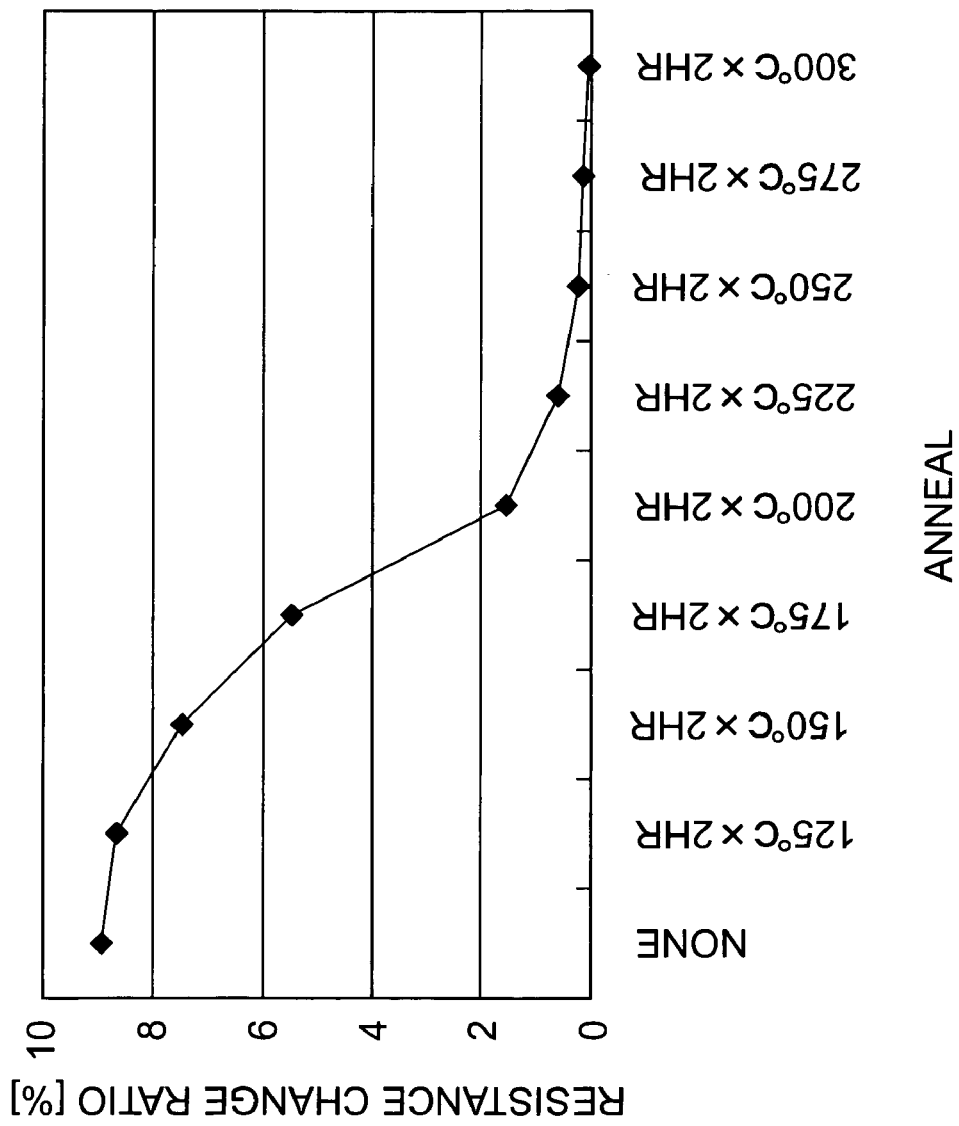
FIG. 13 is a chart showing results of measurement of Example 2.
Figure 14:
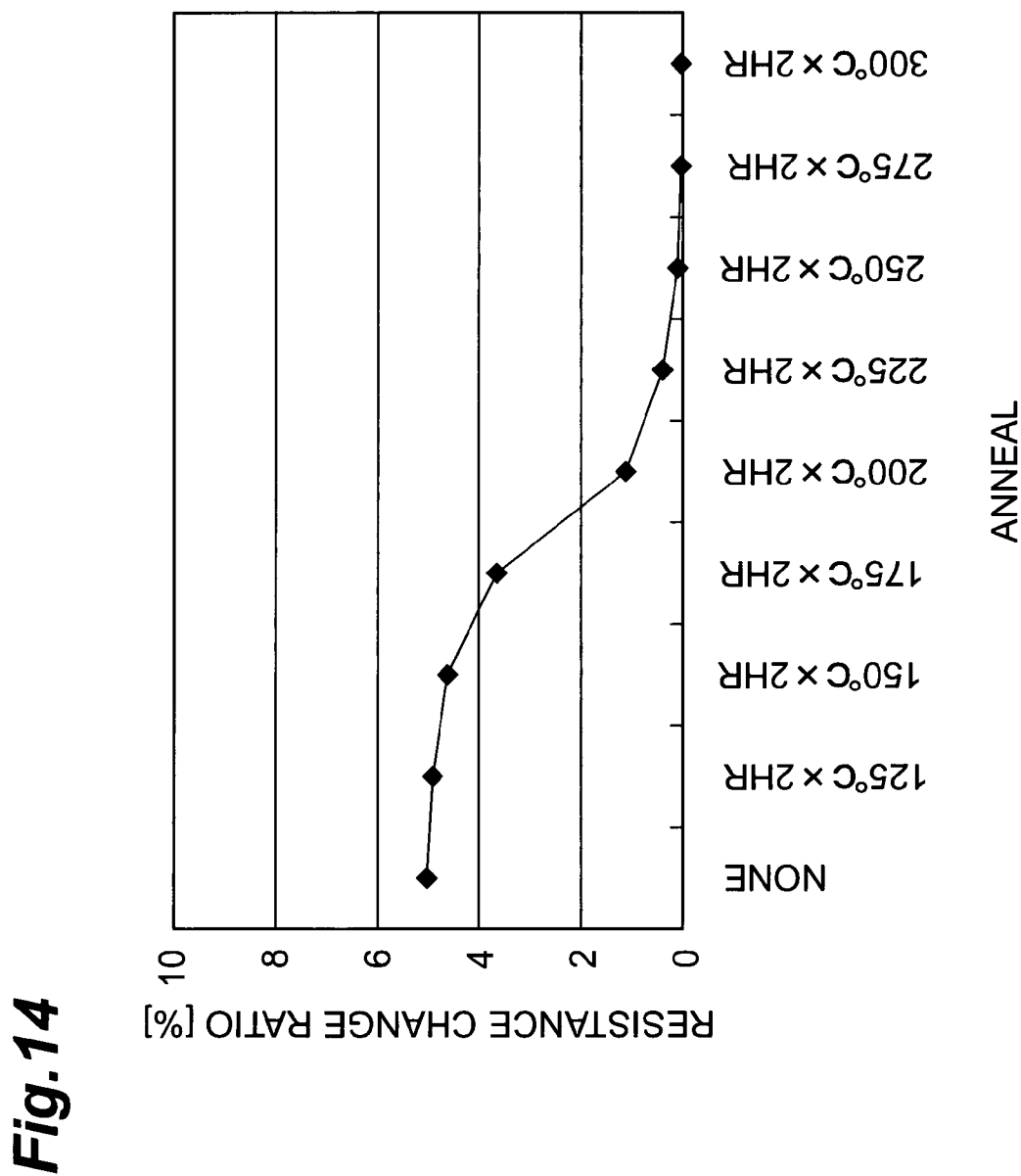
FIG. 14 is a chart showing results of measurement of Example 3.

In the following, Examples and Comparative Examples will be set forth, so as to explain the method of making a thin-film magnetic head in accordance with the present invention in further detail with reference to FIGS. 12 to 14 and Tables 1 to 3, though the present invention is not restricted by these Examples at all.

EXAMPLE 1

In this example, thin-film magnetic heads each equipped with a heater constituted by NiFe was made. In the thin-film magnetic heads, the ohmic value of the heater was measured after 100 operations of energizing and heating the heater for each of the cases where the heater was not annealed and was annealed with different heating temperatures. When the heater was annealed, the respective heating temperatures were 125° C., 150° C., 175° C., 200° C., 225° C., 250° C., 275° C., and 300° C. with an increment of 25° C. The heating time was 2 hours for each case. The ohmic value of the heater before energization was 100 Ω in each case.

Figure 12:
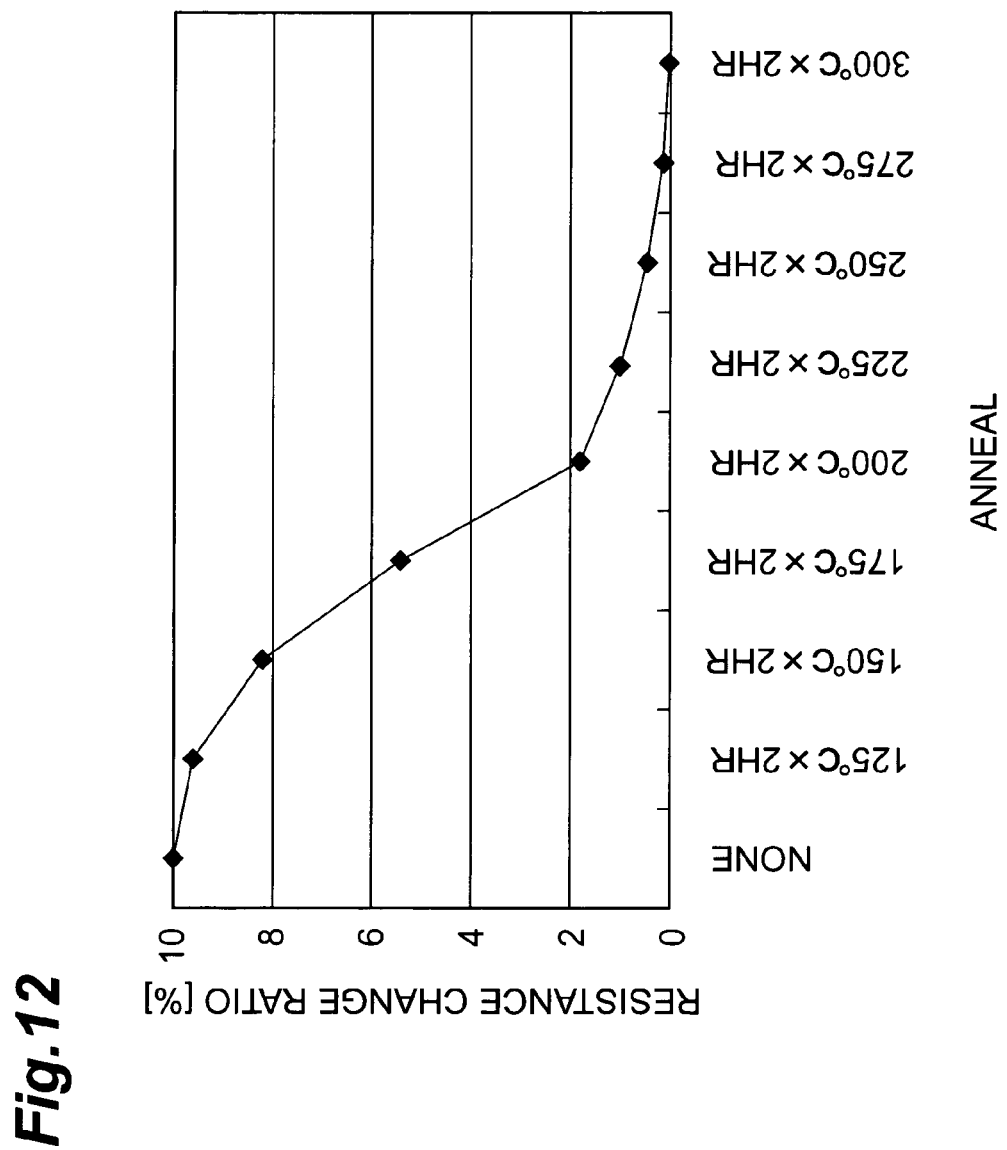
FIG. 12 is a chart showing results of measurement of Example 1.

Table 1 and FIG. 12 show results of measurement. FIG. 12 is a chart showing the ratio of change between the ohmic value (100 Ω) of the heater before energization and that obtained after 100 energizing operations in each case.

As shown in Table 1 and FIG. 12, the resistance change ratio of the heater decreased as the annealing temperature increased. When the heating temperature was 300° C., the ohmic value of the heater was 100 Ω even after the 100 operations, whereby the resistance change ratio became 0. The resistance change ratio was seen to vary much between the case where the heating temperature was 175° C. and the case where the heating temperature was 200° C., so as to become less than 2% at 200° C. and decrease moderately when the temperature exceeded 200° C. as shown in FIG. 12.

TABLE 1

| ANNEAL | OHMIC VALUE BEFORE OPERATION Ω | OHMIC VALUE AFTER 100 OPERATIONS Ω | RESISTANCE CHANGE RATIO % |
|---|---|---|---|
| NONE | 100 | 90 | 10 |
| 125° C. × 2 HR | 100 | 90.4 | 9.6 |
| 150° C. × 2 HR | 100 | 91.8 | 8.2 |
| 175° C. × 2 HR | 100 | 94.6 | 5.4 |
| 200° C. × 2 HR | 100 | 98.2 | 1.8 |
| 225° C. × 2 HR | 100 | 99 | 1 |
| 250° C. × 2 HR | 100 | 99.5 | 0.5 |
| 275° C. × 2 HR | 100 | 99.8 | 0.2 |
| 300° C. × 2 HR | 100 | 100 | 0 |

EXAMPLE 2

Thin-film magnetic heads were made by the same procedure under the same condition as in the method of Example 1 except that each heater was formed from CoFe. The ohmic value of the heater was measured as in Example 1. Table 2 and FIG. 13 show results of measurement.

The resistance change ratio of the heater decreased as the annealing temperature increased in this example as well, so that, when the heating temperature was 300° C., the ohmic value of the heater was 100 Ω even after the 100 operations, whereby the resistance change ratio became 0. The resistance change ratio was seen to vary much between the case where the heating temperature was 175° C. and the case where the heating temperature was 200° C., so as to become less than 2% at 200° C. and decrease moderately when the temperature exceeded 200° C. as shown in FIG. 13.

TABLE 2

| ANNEAL | OHMIC VALUE BEFORE OPERATION Ω | OHMIC VALUE AFTER 100 OPERATIONS Ω | RESISTANCE CHANGE RATIO % |
|---|---|---|---|
| NONE | 100 | 91 | 9 |
| 125° C. × 2 HR | 100 | 91.3 | 8.7 |
| 150° C. × 2 HR | 100 | 92.5 | 7.5 |
| 175° C. × 2 HR | 100 | 94.5 | 5.5 |
| 200° C. × 2 HR | 100 | 98.5 | 1.5 |
| 225° C. × 2 HR | 100 | 99.4 | 0.6 |
| 250° C. × 2 HR | 100 | 99.8 | 0.2 |
| 275° C. × 2 HR | 100 | 99.9 | 0.1 |
| 300° C. × 2 HR | 100 | 100 | 0 |

EXAMPLE 3

Thin-film magnetic heads were made by the same procedure under the same condition as in the method of Example 1 except that each heater was formed from NiCu. The ohmic value of the heater was measured as in Example 1. Table 3 and FIG. 14 show results of measurement.

In this example, the resistance change ratio of the heater decreased as the heating temperature of annealing increased, so that, when the heating temperature was 275° C., the ohmic value of the heater was 100 Ω even after the 100 operations, whereby the resistance change ratio became 0. The resistance change ratio was seen to vary much between the case where the heating temperature was 175° C. and the case where the heating temperature was 200° C. as in Examples 1 and 2, so as to become less than 2% at 200° C. and decrease moderately when the temperature exceeded 200° C. as shown in FIG. 14.

TABLE 3

| ANNEAL | OHMIC VALUE BEFORE OPERATION Ω | OHMIC VALUE AFTER 100 OPERATIONS Ω | RESISTANCE CHANGE RATIO % |
| --- | --- | --- | --- |
| NONE | 100 | 95 | 5 |
| 125° C. × 2 HR | 100 | 95.1 | 4.9 |
| 150° C. × 2 HR | 100 | 95.4 | 4.6 |
| 175° C. × 2 HR | 100 | 96.4 | 3.6 |
| 200° C. × 2 HR | 100 | 98.9 | 1.1 |
| 225° C. × 2 HR | 100 | 99.6 | 0.4 |
| 250° C. × 2 HR | 100 | 99.9 | 0.1 |
| 275° C. × 2 HR | 100 | 100 | 0 |
| 300° C. × 2 HR | 100 | 100 | 0 |

The results of Examples 1 to 3 have verified that the heating temperature for the heater in annealing is preferably 200 to 300° C., since the resistance change ratio shifts to 2% or less at a temperature of 200° C. or lower. When influences on constituent members other than the heater in the thin-film magnetic head are taken into consideration, the heating temperature is preferably up to about 250° C., whereby the heating temperature for the heater in annealing is more preferably 200 to 250° C.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of making a thin-film magnetic head comprising a heater and at least one of a magnetoresistive device for reproducing and an electromagnetic transducer for writing, the method comprising:

forming at least one of the magnetoresistive device and the electromagnetic transducer;

forming a heater constituted by NiFe, NiCu, or CoFe and adapted to generate heat upon energization; and annealing the heater formed by the heater forming step.

2. The method of making a thin-film magnetic head according to claim 1, wherein the heater is heated at a temperature of 200 to 300° C. in the annealing step.

* * * * *